US012601755B2

(12) United States Patent
Ito et al.

(10) Patent No.: US 12,601,755 B2
(45) Date of Patent: Apr. 14, 2026

(54) CHARACTERISTIC CALCULATION DEVICE, CHARACTERISTIC CALCULATION METHOD, AND NON-TRANSITORY COMPUTER-READABLE RECORDING MEDIUM

(71) Applicant: Panasonic Intellectual Property Management Co., Ltd., Osaka (JP)

(72) Inventors: Gimpei Ito, Hyogo (JP); Hiroshi Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 375 days.

(21) Appl. No.: 18/245,670

(22) PCT Filed: Dec. 23, 2021

(86) PCT No.: PCT/JP2021/047796
§ 371 (c)(1),
(2) Date: Mar. 16, 2023

(87) PCT Pub. No.: WO2022/138798
PCT Pub. Date: Jun. 30, 2022

(65) Prior Publication Data
US 2023/0333137 A1 Oct. 19, 2023

(30) Foreign Application Priority Data
Dec. 23, 2020 (JP) ................................. 2020-213146

(51) Int. Cl.
G01P 21/00 (2006.01)
G01H 1/00 (2006.01)
(Continued)

(52) U.S. Cl.
CPC ............. G01P 21/00 (2013.01); G01H 1/003 (2013.01); G01P 15/18 (2013.01); G05B 5/01 (2013.01);
(Continued)

(58) Field of Classification Search
CPC ....................................................... G01P 21/00
See application file for complete search history.

(56) References Cited

U.S. PATENT DOCUMENTS

2006/0116786 A1 6/2006 Iwashita et al.
2006/0116849 A1 6/2006 Taniguchi et al.
(Continued)

FOREIGN PATENT DOCUMENTS

JP H05-229795 A 9/1993
JP H06-138950 A 5/1994
(Continued)

OTHER PUBLICATIONS

International Search Report issued on Mar. 8, 2022 in International Patent Application No. PCT/JP2021/047796, with English translation.
(Continued)

*Primary Examiner* — Walter L Lindsay, Jr.
*Assistant Examiner* — Andrew V Do
(74) *Attorney, Agent, or Firm* — Rimon P.C.

(57) ABSTRACT

A characteristic calculation device includes a sensor information obtainer that obtains position information indicating a position of a motor as detected by a position detector, and acceleration information indicating an acceleration of a movable part connected to the motor as detected by an acceleration sensor attached to the movable part; and a sensor characteristic calculator that calculates and outputs at least one of balance information or detection sensitivity information, based on the position information and the
(Continued)

acceleration information, the balance information indicating a degree of matching between a direction of an axis of detection by the acceleration sensor and a direction of acceleration to be detected by the acceleration sensor, the detection sensitivity information indicating a detection sensitivity of the acceleration sensor.

14 Claims, 8 Drawing Sheets

(51) Int. Cl.

| | |
|---|---|
| *G01P 15/18* | (2013.01) |
| *G05B 5/01* | (2006.01) |
| *G05B 19/404* | (2006.01) |
| *G05B 19/4062* | (2006.01) |

(52) U.S. Cl.
CPC ....... *G05B 19/404* (2013.01); *G05B 19/4062* (2013.01)

(56) References Cited

U.S. PATENT DOCUMENTS

| | | | |
|---|---|---|---|
| 2012/0130667 A1 | | 5/2012 | Fukushima et al. |
| 2015/0081095 A1 | | 3/2015 | Shiraki et al. |

FOREIGN PATENT DOCUMENTS

| | | | | |
|---|---|---|---|---|
| JP | 2006-155180 A | | | 6/2006 |
| JP | 2006-155351 A | | | 6/2006 |
| JP | 2010-166686 A | | | 7/2010 |
| JP | 2011115885 A | | * | 6/2011 |
| JP | 2012-112789 A | | | 6/2012 |
| JP | 5388823 B2 | | | 1/2014 |
| JP | 2014-032024 A | | | 2/2014 |
| WO | 2013/175553 A1 | | | 11/2013 |

OTHER PUBLICATIONS

Extended European Search Report dated May 7, 2024 issued in the corresponding European Patent Application No. 21910938.6.

* cited by examiner

FIG. 9

70 Motor

82

80 Movable part

Position sensor

72

83 Scale

84

CHARACTERISTIC CALCULATION DEVICE, CHARACTERISTIC CALCULATION METHOD, AND NON-TRANSITORY COMPUTER-READABLE RECORDING MEDIUM

CROSS-REFERENCE OF RELATED APPLICATIONS

This application is the U.S. National Phase under 35 U.S.C. § 371 of International Patent Application No. PCT/JP2021/047796, filed on Dec. 23, 2021, which in turn claims the benefit of Japanese Patent Application No. 2020-213146, filed on Dec. 23, 2020, the entire disclosures of which Applications are incorporated by reference herein.

TECHNICAL FIELD

The present disclosure relates to a characteristic calculation device that calculates the characteristics of an acceleration sensor that is attached to a movable part connected to a motor.

BACKGROUND ART

Patent Literature (PTL) 1 discloses a drive control device that calculates the characteristics of an acceleration sensor that is attached to a movable part connected to a motor.

The typical drive control device allows determination of an anomaly in the operation and mounting orientation of the acceleration sensor.

CITATION LIST

Patent Literature

[PTL 1] Japanese Unexamined Patent Application Publication No. 2006-155180

SUMMARY OF INVENTION

Technical Problem

The typical drive control device determines an anomaly in the operation and mounting orientation of the acceleration sensor, based on an acceleration detection value output from the acceleration sensor. Accordingly, for example, if the acceleration sensor is detached from movable part, determining an anomaly in the operation and mounting orientation of the acceleration sensor may be difficult.

The present disclosure was made in view of the problem. It is an objective of the present disclosure to provide a characteristic calculation device, for example, allowing determination of an anomaly in the operation and mounting orientation of the acceleration sensor, even if the acceleration sensor is detached from the movable part.

Solution to Problem

A characteristic calculation device according to an aspect of the present disclosure includes: a sensor information obtainer that obtains position information indicating a position of a motor as detected by a position detector, and acceleration information indicating an acceleration of a movable part connected to the motor as detected by an acceleration sensor attached to the movable part; and a sensor characteristic calculator that calculates and outputs at least one of balance information or detection sensitivity information, based on the position information and the acceleration information, the balance information indicating a degree of matching between a direction of an axis of detection by the acceleration sensor and a direction of acceleration to be detected by the acceleration sensor, the detection sensitivity information indicating a detection sensitivity of the acceleration sensor.

A characteristic calculation method according to an aspect of the present disclosure includes: obtaining position information indicating a position of a motor as detected by a position detector, and acceleration information indicating an acceleration of a movable part connected to the motor as detected by an acceleration sensor attached to the movable part; and calculating and outputting at least one of balance information or detection sensitivity information, based on the position information and the acceleration information, the balance information indicating a degree of matching between a direction of an axis of detection by the acceleration sensor and a direction of acceleration to be detected by the acceleration sensor, the detection sensitivity information indicating a detection sensitivity of the acceleration sensor.

A non-transitory computer-readable recording medium according to an aspect of the present disclosure has recorded thereon a program for causing a characteristic calculation device to execute characteristic calculation processing. The characteristic calculation processing includes: obtaining position information indicating a position of a motor as detected by a position detector, and acceleration information indicating an acceleration of a movable part connected to the motor as detected by an acceleration sensor attached to the movable part; and calculating and outputting at least one of balance information or detection sensitivity information, based on the position information and the acceleration information, the balance information indicating a degree of matching between a direction of an axis of detection by the acceleration sensor and a direction of acceleration to be detected by the acceleration sensor, the detection sensitivity information indicating a detection sensitivity of the acceleration sensor.

Advantageous Effects of Invention

The characteristic calculation device, for example, according to an aspect of the present disclosure allows determination of an anomaly in the operation and mounting orientation of an acceleration sensor, even if the acceleration sensor is detached from a movable part.

BRIEF DESCRIPTION OF DRAWINGS

FIG. 9 is a schematic diagram showing that a position sensor according to Variation 1 is attached to a movable part.

Figure 1:
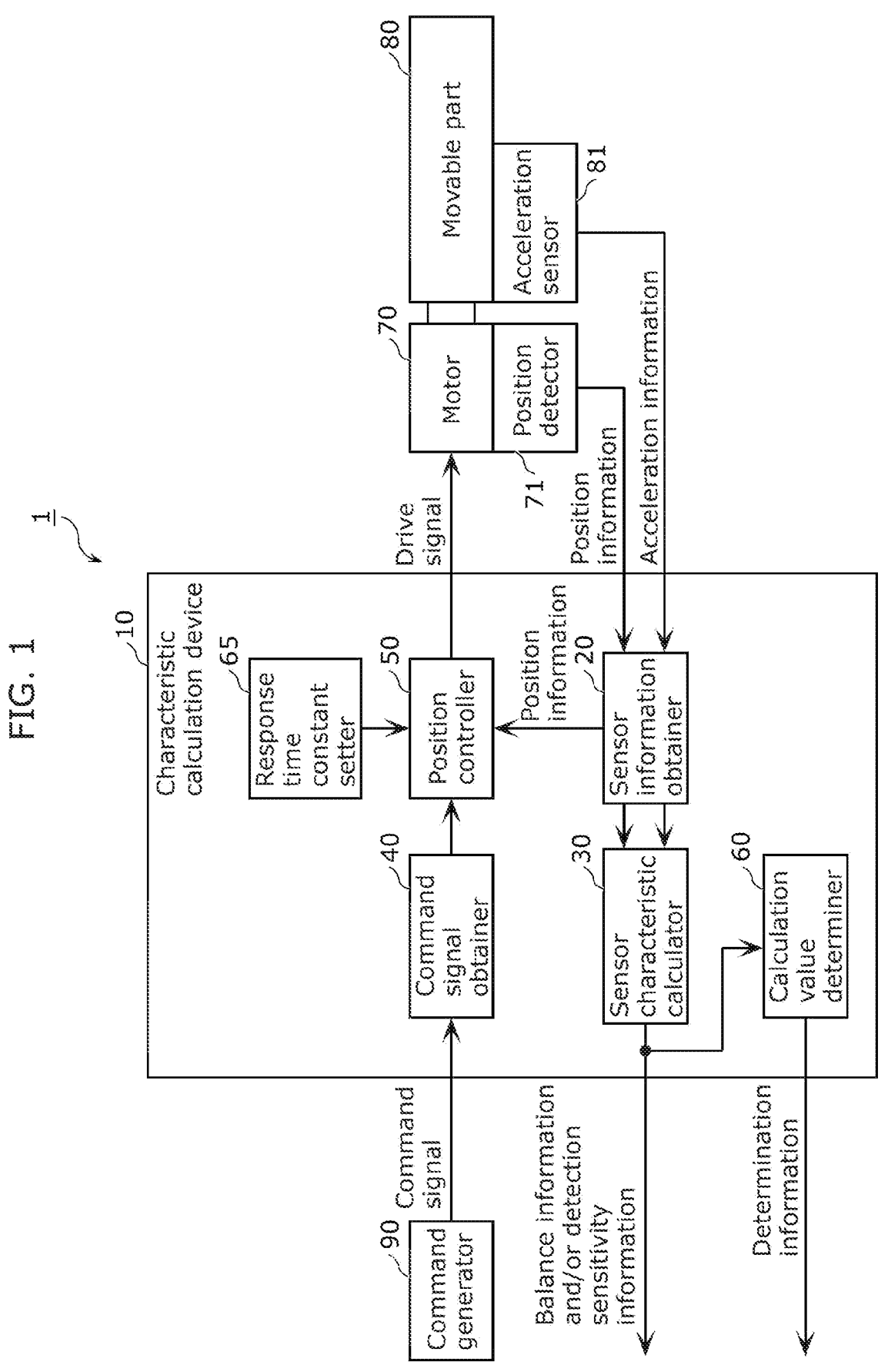
FIG. 1 is a block diagram showing a configuration of a motor control system according to an embodiment.

DESCRIPTION OF EMBODIMENT (Circumstances Leading to the Present Disclosure)

As described above, the typical drive control device may have difficulty in determining an anomaly in the operation and mounting orientation of an acceleration sensor, if the acceleration sensor is detached from a movable part.

The present inventors have found the problem and thought of the following characteristic calculation device, for example, to address the problem.

A characteristic calculation device according to an aspect of the present disclosure includes: a sensor information obtainer that obtains position information indicating a position of a motor as detected by a position detector, and acceleration information indicating an acceleration of a movable part connected to the motor as detected by an acceleration sensor attached to the movable part; and a sensor characteristic calculator that calculates and outputs at least one of balance information or detection sensitivity information, based on the position information and the acceleration information, the balance information indicating a degree of matching between a direction of an axis of detection by the acceleration sensor and a direction of acceleration to be detected by the acceleration sensor, the detection sensitivity information indicating a detection sensitivity of the acceleration sensor.

The characteristic calculation device with the configuration described above calculates at least one of the balance information or the detection sensitivity information, based on the position of the motor as detected by the position detector in addition to the acceleration of the movable part as detected by the acceleration sensor.

Accordingly, the characteristic calculation device with the configuration described above allows determination of an anomaly in the operation and mounting orientation of the acceleration sensor, even if the acceleration sensor is detached from the movable part.

The sensor characteristic calculator may calculate the at least one of the balance information or the detection sensitivity information, when an acceleration of the motor as calculated based on the position information does not change for a predetermined period or more.

This configuration allows more accurate calculation of at least one of the balance information or the detection sensitivity information.

The characteristic calculation device may further include: a command signal obtainer that obtains a command signal for moving the movable part to a target position, the command signal being generated by a command generator; and a position controller that generates a drive signal for driving the motor to move the movable part to the target position, based on the command signal and the position information, and outputs the drive signal generated to the motor. The command generator may generate the command signal not to change the acceleration of the motor as indicated by the command signal for the predetermined period or more.

This configuration provides a command signal not to change the acceleration of the motor for the predetermined period.

The command generator may further generate the command signal not to change a position of the motor as indicated by the command signal for the predetermined period or more.

This configuration provides a command signal not to change the position of the motor for the predetermined period.

The characteristic calculation device may further include: a command signal obtainer that obtains a command signal for moving the movable part to a target position, the command signal being generated by a command generator; and a position controller that generates a drive signal for driving the motor to move the movable part to the target position, based on the command signal and the position information, and outputs the drive signal generated to the motor. The command generator may generate the command signal not to change the acceleration of the motor as indicated by the command signal from a first value for a first period longer than a response time constant of the position controller.

This configuration provides a command signal not to change the acceleration of the motor for the period longer than the response time constant of the position controller.

The command generator may generate the command signal not to change the acceleration of the motor as indicated by the command signal from the first value for the first period longer than the response time constant of the position controller, while the sensor characteristic calculator calculates the at least one of the balance information or the detection sensitivity information.

This configuration allows more accurate calculation of at least one of the balance information or the detection sensitivity information.

The characteristic calculation device may further include: a response time constant setter that sets the response time constant. The response time constant setter may set the response time constant to cause the first period to be longer than a duration of ringing which occurs in the acceleration of the movable part converging to a second value corresponding to the first value.

Accordingly, the first period becomes longer than the duration of the ringing.

The response time constant setter may set the response time constant to cause the first period to be longer than the duration of the ringing, while the sensor characteristic calculator calculates the at least one of the balance information or the detection sensitivity information.

This configuration allows more accurate calculation of at least one of the balance information or the detection sensitivity information.

The sensor information obtainer may further obtain movable part position information indicating a position of the movable part as detected by a position sensor attached to the movable part. The sensor characteristic calculator may calculate the at least one of the balance information or the detection sensitivity information, based on the movable part position information and the acceleration information in place of the position information and the acceleration information.

This configuration allows calculation of at least one of the balance information or the detection sensitivity information using the movable part position information in place of the position information.

The characteristic calculation device may further include: a calculation value determiner that outputs determination information indicating that at least any of the degree of matching or the detection sensitivity deviates from a predetermined reference value, when the at least any of the degree of matching or the detection sensitivity deviates from the predetermined reference value.

This configuration allows notification of a possible anomaly in the operation or mounting orientation of the acceleration sensor to a user of the characteristic calculation device.

The sensor information obtainer may further obtain movable part position information indicating a position of the movable part as detected by a position sensor attached to the movable part. The calculation value determiner may output the determination information, when at least any of the degree of matching or the detection sensitivity deviates from the predetermined reference value, and the position of the movable part indicated by the movable part position information meets a predetermined condition.

This configuration allows more accurate notification of a possible anomaly in the operation or mounting orientation of the acceleration sensor to a user of the characteristic calculation device.

The characteristic calculation device may further include: a calculation value determiner that outputs determination information indicating that an amount of change per unit time in at least any of the degree of matching or the detection sensitivity deviates from a predetermined reference value, when the amount of change per unit time in the at least any of the degree of matching or the detection sensitivity deviates from the predetermined reference value.

This configuration allows notification of a possible anomaly in the operation or mounting orientation of the acceleration sensor to a user of the characteristic calculation device.

The acceleration sensor may be a three-axis acceleration sensor.

This configuration allows calculation of at least one of the balance information or the detection sensitivity information of the three-axis acceleration sensor.

A characteristic calculation method according to an aspect of the present disclosure includes: obtaining position information indicating a position of a motor as detected by a position detector, and acceleration information indicating an acceleration of a movable part connected to the motor as detected by an acceleration sensor attached to the movable part; and calculating and outputting at least one of balance information or detection sensitivity information, based on the position information and the acceleration information, the balance information indicating a degree of matching between a direction of an axis of detection by the acceleration sensor and a direction of acceleration to be detected by the acceleration sensor, the detection sensitivity information indicating a detection sensitivity of the acceleration sensor.

The characteristic calculation method described above includes calculating at least one of the balance information or the detection sensitivity information, based on the position of the motor as detected by the position detector in addition to the acceleration of the movable part as detected by the acceleration sensor.

Accordingly, the characteristic calculation method described above allows determination of an anomaly in the operation and mounting orientation of an acceleration sensor, even if the acceleration sensor is detached from the movable part.

A non-transitory computer-readable recording medium according to an aspect of the present disclosure has recorded thereon a program for causing a characteristic calculation device to execute characteristic calculation processing. The characteristic calculation processing includes: obtaining position information indicating a position of a motor as detected by a position detector, and acceleration information indicating an acceleration of a movable part connected to the motor as detected by an acceleration sensor attached to the movable part; and calculating and outputting at least one of balance information or detection sensitivity information, based on the position information and the acceleration information, the balance information indicating a degree of matching between a direction of an axis of detection by the acceleration sensor and a direction of acceleration to be detected by the acceleration sensor, the detection sensitivity information indicating a detection sensitivity of the acceleration sensor.

The program described above includes calculating at least one of the balance information or the detection sensitivity information, based on the position of the motor as detected by the position detector in addition to the acceleration of the movable part as detected by the acceleration sensor.

Accordingly, a non-transitory computer-readable recording medium having recorded thereon the program described above according to an aspect of the present disclosure allows determination of an anomaly in the operation and mounting orientation of the acceleration sensor, even if the acceleration sensor is detached from the movable part.

Now, a specific example of a characteristic calculation device according to an aspect of the present disclosure will be described with reference to the drawings. The embodiment described below is a mere specific example of the present disclosure. The numerical values, shapes, constituent elements, the arrangement and connection of the constituent elements, steps, step orders etc. shown in the following embodiment are thus mere examples, and are not intended to limit the scope of the present disclosure. The figures are schematic representations and not necessarily drawn strictly to scale. In the following description, the same reference signs are used to represent substantially the same configurations in the drawings and redundant description will be omitted or simplified.

EMBODIMENT

Now, a motor control system according to an embodiment will be described. This motor control system controls a motor and moves a movable part, which is connected to the motor, to a target position. This motor control system may be production equipment including a part mounted on a substrate, for example.

[Configuration]

FIG. 1 is a block diagram showing a configuration of motor control system 1 according to the embodiment.

As shown in FIG. 1, motor control system 1 includes characteristic calculation device 10, motor 70, movable part 80, command generator 90, position detector 71, and acceleration sensor 81.

Motor 70 is driven by a drive signal output from characteristic calculation device 10. An example will be described here where motor 70 is a rotary motor. However, motor 70 is not necessarily a rotary motor but may be a linear motor, for example.

The drive signal is a current for rotating motor 70, for example.

Position detector 71 detects the position of motor 70 and outputs position information indicating the detected position of motor 70 to characteristic calculation device 10.

Position detector 71 may or may not be attached to motor 70.

Position detector 71 may be an encoder, for example. In this case, position information output by position detector 71 serves as an encoder signal.

An example will be described here where position detector 71 is an encoder attached to motor 70.

Movable part 80 is connected to motor 70. For example, if motor control system 1 is production equipment including a part mounted on a substrate, movable part 80 is a header that transfers the part to the mounting position.

Acceleration sensor 81 is attached to movable part 80 to detect the acceleration of movable part 80 and output acceleration information, which indicates the detected acceleration of movable part 80, to characteristic calculation device 10.

Command generator 90 generates a command signal for moving movable part 80 to a target position and outputs the generated command signal to characteristic calculation device 10. The command signal may be, for example, a position command signal indicating a position command for moving movable part 80 to a target position or a speed command signal indicating a speed command for moving movable part 80 to a target position. Alternatively, the command signal may be an acceleration command signal indicating an acceleration command for moving movable part 80 to a target position, or a torque command signal indicating a torque command for moving movable part 80 to a target position.

Characteristic calculation device 10 receives the command signal, the position information, and the acceleration information, and outputs (1) at least one of balance information or detection sensitivity information, (2) determination information, and (3) a drive signal. The balance information indicates the degree of matching (hereinafter also referred to as a "balance") between the direction of the axis of detection by acceleration sensor 81 and the direction of acceleration to be detected by acceleration sensor 81. The detection sensitivity information indicates the detection sensitivity of acceleration sensor 81. The determination information indicates that at least any of the balance of acceleration sensor 81 and the detection sensitivity of acceleration sensor 81 deviates from a predetermined reference value.

Characteristic calculation device 10 may be, for example, a computer device including a processor, a memory, and an input/output interface. The processor executes programs stored in the memory. Alternatively, characteristic calculation device 10 may be a dedicated hardware circuit, for example. Characteristic calculation device 10 may be a combination of a dedicated hardware circuit and a computer device including a processor that executes programs stored in a memory.

Characteristic calculation device 10 includes sensor information obtainer 20, sensor characteristic calculator 30, command signal obtainer 40, position controller 50, calculation value determiner 60, and response time constant setter 65.

Sensor information obtainer 20 obtains position information output from position detector 71 and acceleration information output from acceleration sensor 81.

Command signal obtainer 40 obtains a command signal output from command generator 90.

Position controller 50 generates a drive signal for driving motor 70 to move movable part 80 to a target position, based on the command signal obtained by command signal obtainer 40 and the position information obtained by sensor information obtainer 20. Position controller 50 then outputs the generated drive signal to motor 70.

Position controller 50 may generate a drive signal by feedback control of feeding back the position information obtained by sensor information obtainer 20 in response to the command signal obtained by command signal obtainer 40, for example.

Sensor characteristic calculator 30 calculates and outputs at least one of balance information or detection sensitivity information, based on the position information and acceleration information obtained by sensor information obtainer 20.

Figure 2:
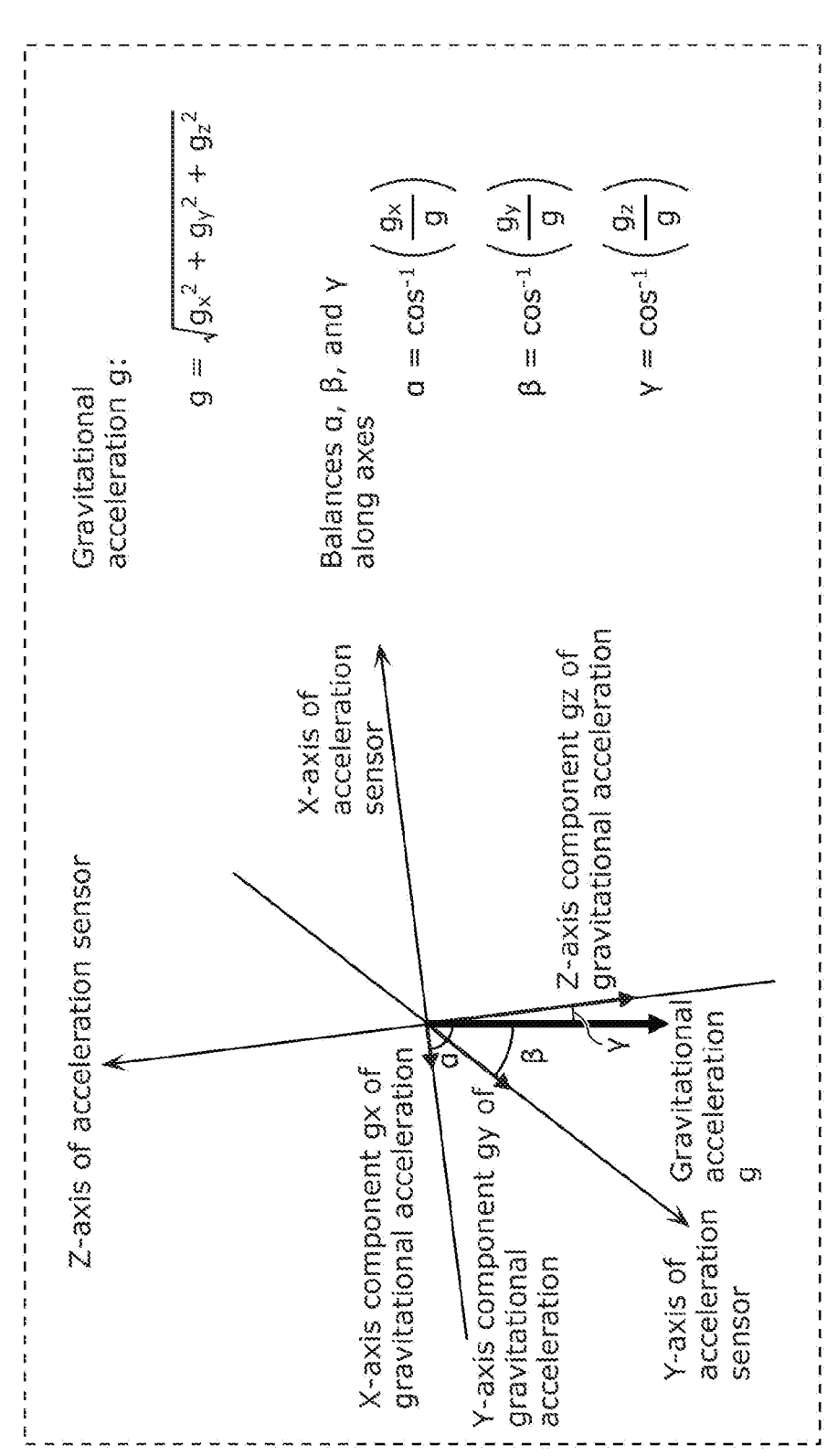
FIG. 2 is a schematic diagram showing an example where a sensor characteristic calculator according to the embodiment calculates balance information or detection sensitivity information.

FIG. 2 is a schematic diagram showing an example where sensor characteristic calculator 30 calculates balance information or detection sensitivity information, based on position information and acceleration information.

In this example, acceleration sensor 81 is a three-axis acceleration sensor that detects accelerations along three axes of X-, Y-, and Z-axes that are orthogonal to each other.

As shown in FIG. 2, while not accelerated, that is, in a uniform linear motion or stopped, acceleration sensor 81 detects gravitational acceleration g. Accordingly, acceleration sensor 81 outputs acceleration information indicating X-axis component gx, Y-axis component gy, and Z-axis component gz of gravitational acceleration g.

After the obtainment of this acceleration information, sensor characteristic calculator 30 calculates gravitational acceleration g detected by acceleration sensor 81 using Equation (1).

[Math. 1]

$$g = \sqrt{g_x^2 + g_y^2 + g_z^2} \tag{1}$$

Sensor characteristic calculator 30 then calculates the detection sensitivity of acceleration sensor 81 based on the ratio between calculated gravitational acceleration g and the actual gravitational acceleration.

Sensor characteristic calculator 30 also calculates balances $\alpha$, $\beta$, and $\gamma$ of acceleration sensor 81 along the X-, Y-, and Z-axes by applying Equations (2), (3), and (4) to the obtained acceleration information.

[Math. 2]

$$\alpha = \cos^{-1}\left(\frac{g_x}{g}\right) \tag{2}$$

[Math. 3]

$$\beta = \cos^{-1}\left(\frac{g_y}{g}\right) \tag{3}$$

[Math. 4]

$$\gamma = \cos^{-1}\left(\frac{g_z}{g}\right) \quad (4)$$

In this example, assume that the acceleration of motor 70 as calculated based on the position information does not change for a predetermined period or more. In this case, sensor characteristic calculator 30 calculates the balance information or detection sensitivity information described above. In particular, assume that the position of motor 70 as calculated based on the position information does not change for a predetermined period or more. In this case, sensor characteristic calculator 30 calculates the balance information or detection sensitivity information described above in one preferred embodiment.

In order to achieve this, command generator 90 generates a command signal not to change the acceleration of motor 70 for a predetermined period or more in one preferred embodiment. In particular, command generator 90 generates a command signal not to change the position of motor 70 for a predetermined period or more in one preferred embodiment.

Figure 3:
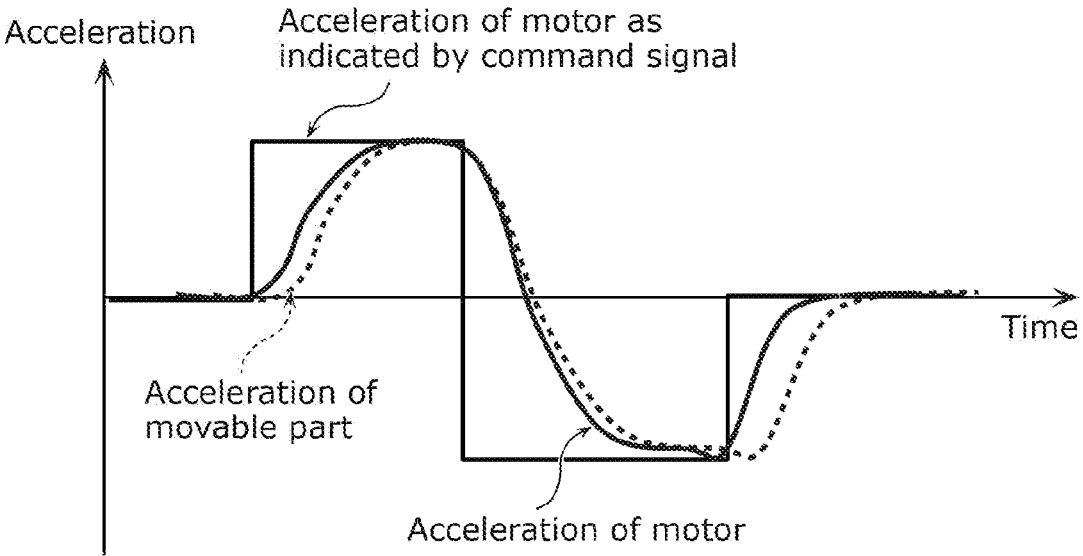
FIG. 3 is a schematic diagram showing another example where the sensor characteristic calculator according to the embodiment calculates balance information or detection sensitivity information.

FIG. 3 is a schematic diagram showing another example where sensor characteristic calculator 30 calculates balance information or detection sensitivity information, based on position information and acceleration information.

In this example, acceleration sensor 81 is a single axis acceleration sensor attached to movable part 80 with the axis of detection extending in the direction of acceleration of movable part 80.

As shown in FIG. 3, command generator 90 outputs a command signal to accelerate movable part 80 at a first acceleration value for a certain period. Following the command signal with a little delay, motor 70 and movable part 80 are accelerated. The acceleration of motor 70 then converges to the first value indicated by the command signal, while the acceleration of movable part 80 converges to a second value corresponding the first acceleration.

In the example of FIG. 3, acceleration sensor 81 has ideal balance and sensitivity (i.e., the axis of detection by acceleration sensor 81 matches with the direction of acceleration of movable part 80 and the sensitivity is equal to a specification value). In addition, the first value, to which the acceleration of motor 70 converges, is equal to the second value, to which the acceleration of movable part 80 converges.

Sensor characteristic calculator 30 performs second order differential of the position information obtained by sensor information obtainer 20 in time to calculate a transition in the acceleration of motor 70 over time. Sensor characteristic calculator 30 also calculates a transition in the acceleration of movable part 80 over time based on the acceleration information obtained by sensor information obtainer 20.

Sensor characteristic calculator 30 compares the following accelerations. One of the accelerations is the acceleration of motor 70 in a section with a constant acceleration within the calculated transition in the acceleration of motor 70 over time (i.e., the first value to which the acceleration of motor 70 converges). The other is the acceleration of movable part 80 in a section with a constant acceleration within the calculated transition in the acceleration of movable part 80 over time (i.e., the second value to which the acceleration of movable part 80 converges). If there is a deviation from the ideal balance and sensitivity of acceleration sensor 81, a difference occurs in the result of comparison. Sensor characteristic calculator 30 calculates the balance or detection sensitivity of acceleration sensor 81 based on the result of comparison.

In this case, assume that the acceleration of motor 70 as calculated based on the position information does not change for a predetermined period or more. In this case, sensor characteristic calculator 30 calculates the balance information or detection sensitivity information described above.

In order to achieve this, command generator 90 generates a command signal not to change the acceleration of motor 70 for a predetermined period or more in one preferred embodiment.

In order to allow sensor characteristic calculator 30 to calculate the balance information or detection sensitivity information described above, the acceleration of motor 70 needs to converge to the first value, while the acceleration of movable part 80 needs to converge to the second value.

In order to achieve this, command generator 90 generates a command signal not to change the acceleration of motor 70 as indicated by the command signal from the first value for a period longer than the response time constant of position controller 50. In particular, command generator 90 generates the command signal described above in one preferred embodiment, while sensor characteristic calculator 30 calculates the balance information or detection sensitivity information described above. Here, the response time constant is a period from when a command signal is input to position controller 50 to when position controller 50 drives motor 70 with the acceleration of motor 70 as determined by the command signal.

Figure 4:
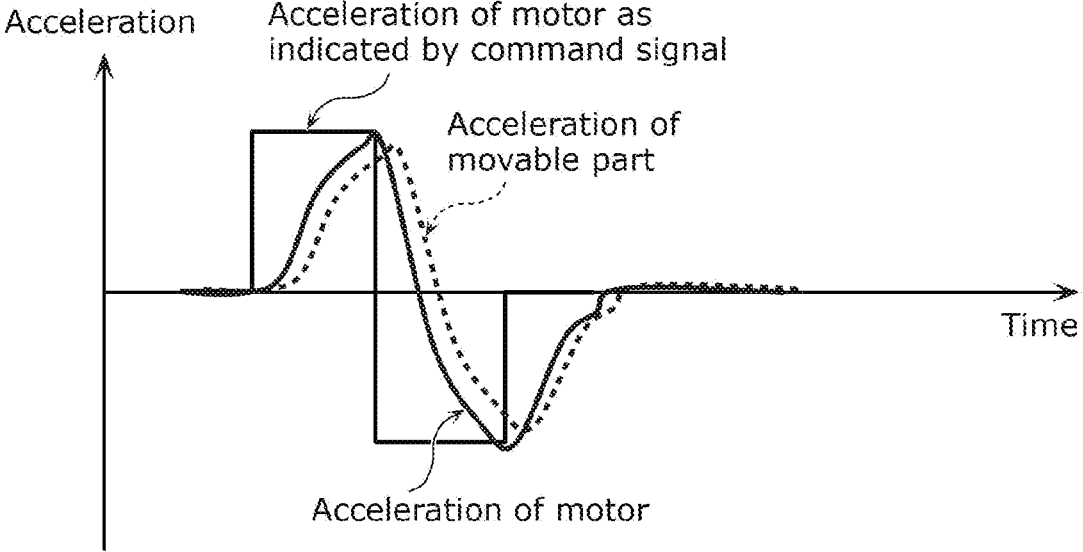
FIG. 4 is a schematic diagram showing an example where the sensor characteristic calculator according to the embodiment calculates balance information or detection sensitivity information.

FIG. 4 is a schematic diagram showing the following example. Command generator 90 generates a command signal not to change the acceleration of motor 70 as indicated by the command signal from the first value for a period shorter than the response time constant of position controller 50. Sensor characteristic calculator 30 calculates balance information or detection sensitivity information, based on the position information and the acceleration information.

As shown in FIG. 4, command generator 90 outputs a command signal to accelerate movable part 80 at a first acceleration value for a certain period shorter than the response time constant of position controller 50. Following the command signal with a little delay, motor 70 and movable part 80 are accelerated. However, the acceleration of motor 70 does not sufficiently converge to the first value indicated by the command signal and the acceleration of movable part 80 does not sufficiently converge to the second value corresponding the first acceleration.

Accordingly, sensor characteristic calculator 30 fails to calculate the balance or detection sensitivity of acceleration sensor 81 relatively accurately.

Figure 5:
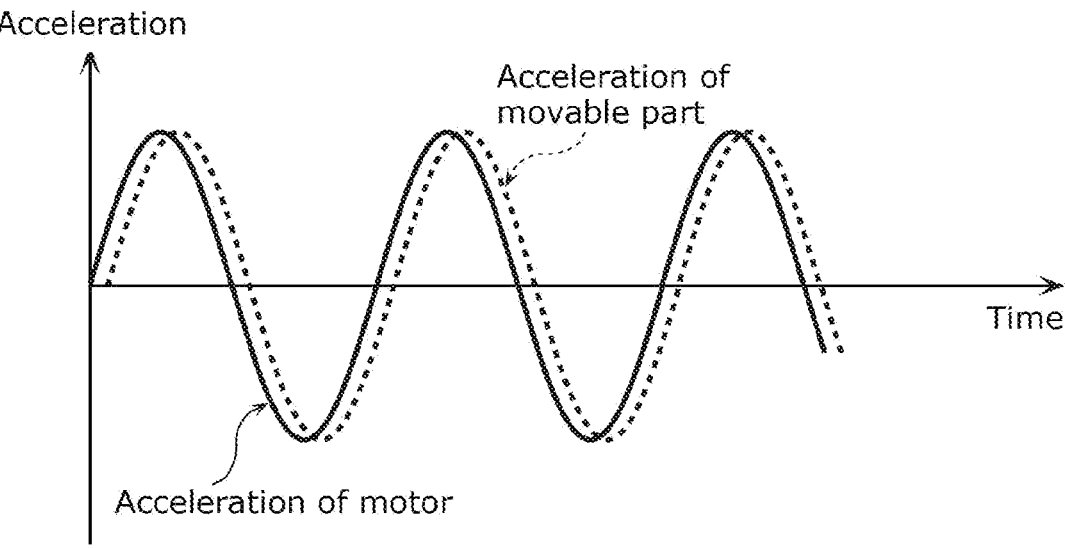
FIG. 5 is a schematic diagram showing another example where the sensor characteristic calculator according to the embodiment calculates balance information or detection sensitivity information.

FIG. 5 is a schematic diagram showing another example where sensor characteristic calculator 30 calculates balance information or detection sensitivity information, based on position information and acceleration information.

In this example, acceleration sensor 81 is a single axis acceleration sensor attached to movable part 80 with the axis of detection extending in the direction of acceleration of movable part 80.

Command generator 90 outputs a command signal indicating that the acceleration of motor 70 and the acceleration of movable part 80 change in a sine wave. Then, as shown in FIG. 5, the acceleration of motor 70 and the acceleration of movable part 80 change in a sine wave.

In the example in FIG. 5, acceleration sensor 81 has ideal balance and sensitivity (i.e., the axis of detection by acceleration sensor 81 matches with the direction of acceleration of movable part 80 and the sensitivity is equal to a specification value). In addition, the amplitudes of the transitions in the accelerations of motor 70 and movable part 80 over time are equal to each other.

At this time, sensor characteristic calculator 30 performs second order differential of the position information obtained by sensor information obtainer 20 in time to calculate a transition in the acceleration of motor 70 over time. Sensor characteristic calculator 30 also calculates a transition in the acceleration of movable part 80 over time based on the acceleration information obtained by sensor information obtainer 20.

Sensor characteristic calculator 30 compares the amplitudes of the calculated transitions in the accelerations of motor 70 and movable part 80 over time. If there is a deviation from the ideal balance and sensitivity of acceleration sensor 81, a difference occurs in the result of comparison. Sensor characteristic calculator 30 calculates the balance or detection sensitivity of acceleration sensor 81 based on the result of comparison.

Referring back to FIG. 1, description of motor control system 1 will be continued.

Calculation value determiner 60 determines whether at least any of the balance indicated by the balance information or the detection sensitivity indicated by the detection sensitivity information as calculated by sensor characteristic calculator 30 deviates from a predetermined reference value. Upon determining a deviation, calculation value determiner 60 outputs determination information indicating that at least any of the balance indicated by the balance information or the detection sensitivity indicated by the detection sensitivity information deviates from the predetermined reference value.

Assume that command generator 90 generates a command signal not to change the acceleration of motor 70 as indicated by the command signal from the first value in a first period longer than the response time constant of position controller 50. In this case, response time constant setter 65 sets the response time constant of position controller 50 to cause the first period to be longer than the duration of ringing which occurs in the acceleration of movable part 80 when the acceleration of movable part 80 converges to a second value corresponding to the first value. In particular, response time constant setter 65 sets the response time constant in one preferred embodiment, while sensor characteristic calculator 30 calculates the balance information or the detection sensitivity information.

Response time constant setter 65 may set the response time constant of position controller 50 by updating a gain parameter for determining the gain of the drive signal relative to the command signal in position controller 50, for example.

Figure 6:
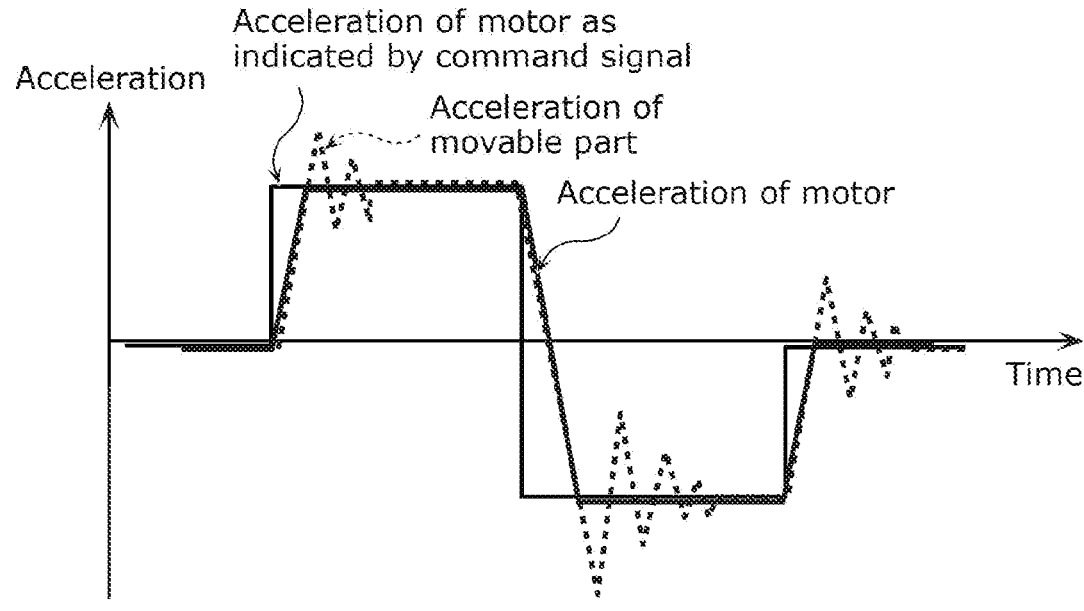
FIG. 6 is a schematic diagram showing ringing in the acceleration of a movable part where a position controller according to the embodiment has a relatively great response time constant.

FIG. 6 is a schematic diagram showing that ringing occurs in the acceleration of movable part 80, where position controller 50 has a relatively great response time constant. By contrast, FIG. 3 is a schematic view showing that no ringing occurs in the acceleration of movable part 80, where position controller 50 has a relatively small response time constant.

As shown in FIG. 6, if position controller 50 has a relatively great response time constant, the acceleration of movable part 80 increases rapidly. Accordingly, ringing occurs in the acceleration of movable part 80. If sensor characteristic calculator 30 calculates the balance or detection sensitivity of acceleration sensor 81 at the presence of ringing, the accuracy in calculating the balance or detection sensitivity of acceleration sensor 81 may be reduced.

By contrast, as shown in FIG. 3, if position controller 50 has a relatively small response time constant, the acceleration of movable part 80 increases slowly. Accordingly, no ringing occurs in the acceleration of movable part 80. If sensor characteristic calculator 30 calculates the balance or detection sensitivity of acceleration sensor 81 at the absence of ringing, the accuracy in calculating the balance or detection sensitivity of acceleration sensor 81 is less reduced.

[Operation]

Now, an operation performed by characteristic calculation device 10 with the configuration described above will be described.

Characteristic calculation device 10 performs characteristic calculation processing of calculating and outputting at least one of balance information or detection sensitivity information, based on position information and acceleration information.

The characteristic calculation processing starts, for example, when position detector 71 outputs position information and acceleration sensor 81 outputs acceleration information.

Figure 7:
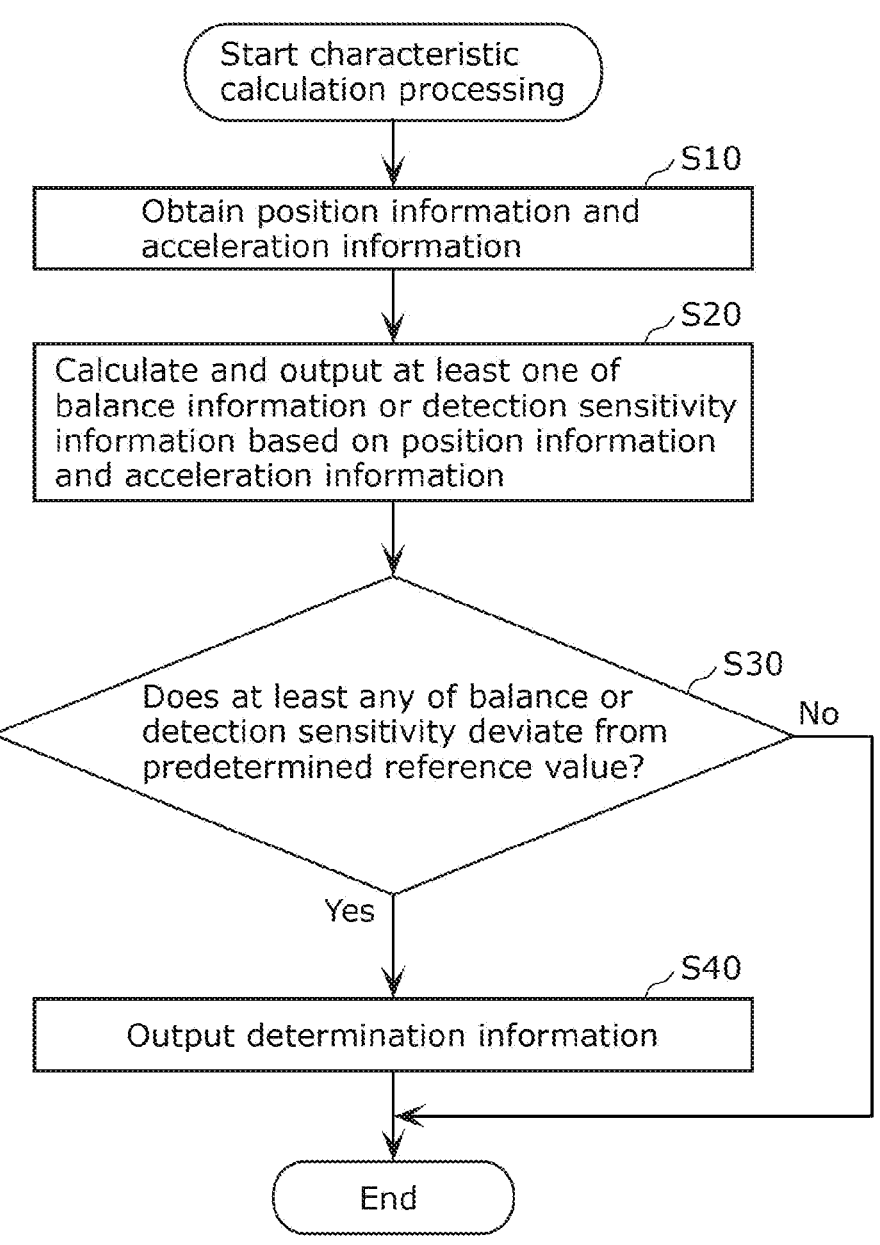
FIG. 7 is a flowchart of characteristic calculation processing according to the embodiment.

FIG. 7 is a flowchart of the characteristic calculation processing performed by characteristic calculation device 10.

As shown in FIG. 7, after the start of the characteristic calculation processing, sensor information obtainer 20 obtains the position information output from position detector 71 and the acceleration information output from acceleration sensor 81 (step S10).

After the obtainment of the position information and the acceleration information, sensor characteristic calculator 30 calculates and outputs at least one of balance information or detection sensitivity information, based on the position information and acceleration information obtained by sensor information obtainer 20 (step S20).

Upon calculation of at least one of the balance information or the detection sensitivity information, calculation value determiner 60 determines whether at least any of the balance indicated by the balance information or the detection sensitivity indicated by the detection sensitivity information as calculated by sensor characteristic calculator 30 deviates from a predetermined reference value (step S30).

Assume that at least any of the balance or the detection sensitivity deviates from the predetermined reference value in the processing in step S30 (Yes in step S30). In this case, calculation value determiner 60 outputs determination information indicating that at least any of the balance or the detection sensitivity deviates from the predetermined reference value (step S40).

Assume that the processing in step S40 ends or none of the balance or the detection sensitivity deviates from the predetermined reference value in the processing in step S30 (No in step S30). In this case, characteristic calculation device 10 ends its characteristic calculation processing.

[Study]

As described above, characteristic calculation device 10 with the configuration described above calculates at least one of the balance information or the detection sensitivity information, based on the position of motor 70 as detected by position detector 71 in addition to the acceleration of movable part 80 as detected by acceleration sensor 81.

Accordingly, characteristic calculation device 10 with the configuration described above determines an anomaly in the operation or mounting orientation of acceleration sensor 81, even if acceleration sensor 81 is detached from movable part 80.

Assume that at least any of the balance indicated by the balance information or the detection sensitivity indicated by the detection sensitivity information deviates from a predetermined reference value. In this case, as described above, characteristic calculation device 10 with the configuration described above outputs determination information indicating that at least any of the balance indicated by the balance information or the detection sensitivity indicated by the detection sensitivity information deviates from the predetermined reference value.

Accordingly, characteristic calculation device 10 with the configuration described above can notify a user of characteristic calculation device 10 of a possible anomaly in the operation or mounting orientation of acceleration sensor 81.

[Variation 1]

Described below is a motor control system according to Variation 1 obtained by partially modifying motor control system 1 according to the embodiment.

In the configuration example of motor control system 1 according to the embodiment, position detector 71 is attached to motor 70 and acceleration sensor 81 is attached to movable part 80. On the other hand, in the configuration example of the motor control system according to Variation 1, a position detection sensor that detects the position of movable part 80 is further attached to movable part 80.

The components of the motor control system according to Variation 1, which are the same as those of motor control system 1 according to the embodiment, are regarded as being described already. In the following description, the same reference signs are used to represent substantially the same components and detailed description thereof will be omitted. Differences from motor control system 1 will be described mainly.

Figure 8:
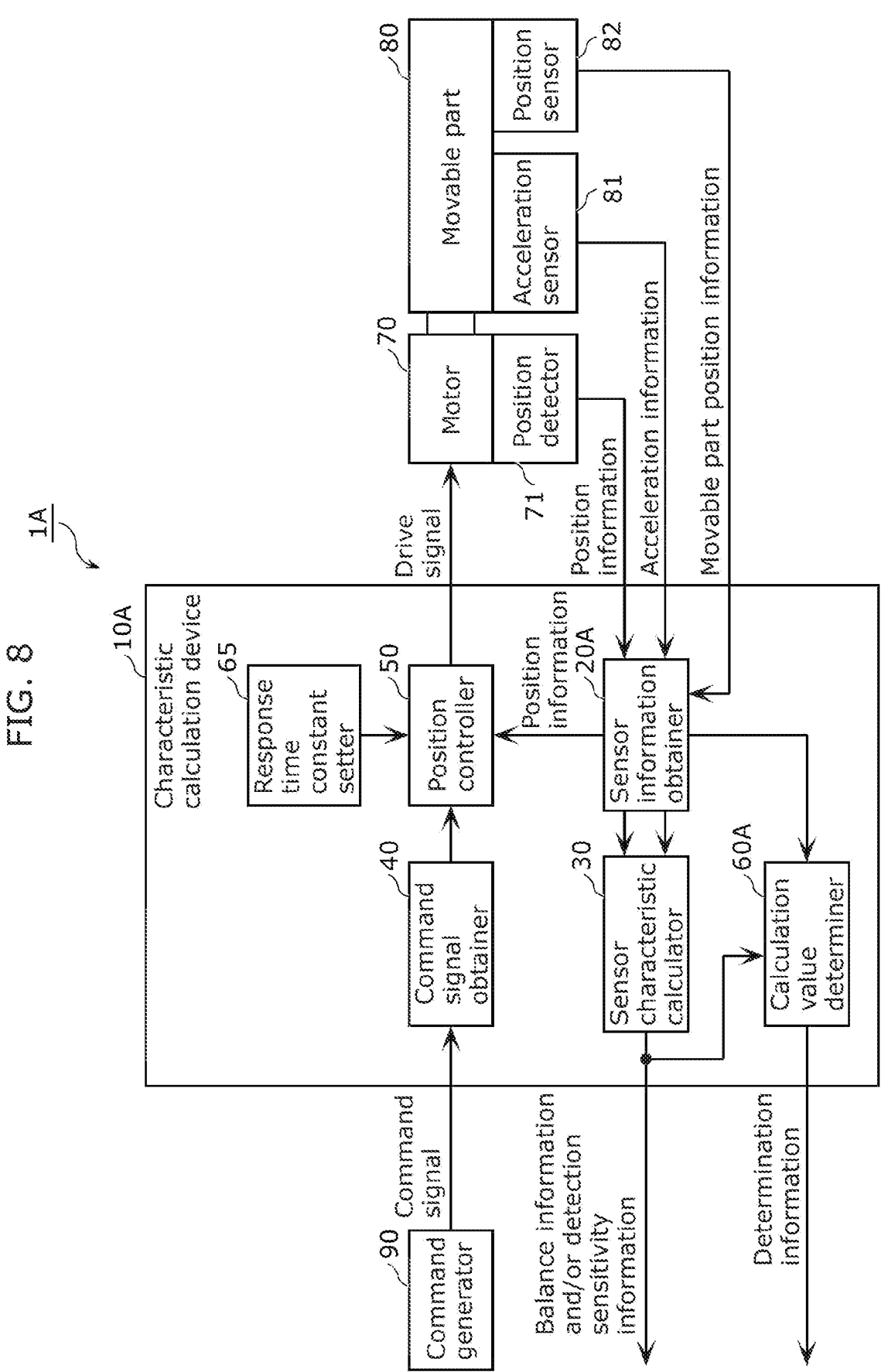
FIG. 8 is a block diagram showing a configuration of a motor control system according to Variation 1.

FIG. 8 is a block diagram showing a configuration of motor control system 1A according to Variation 1.

As shown in FIG. 8, different from motor control system 1 according to Embodiment 1, motor control system 1A further includes position sensor 82, and includes characteristic calculation device 10A in place of characteristic calculation device 10. Different from characteristic calculation device 10, characteristic calculation device 10A includes sensor information obtainer 20A in place of sensor information obtainer 20, and calculation value determiner 60A in place of calculation value determiner 60.

Position sensor 82 is attached to movable part 80 to detect the position of movable part 80 and output movable part position information, which indicates the detected position of movable part 80, to characteristic calculation device 10A.

Figure 9:
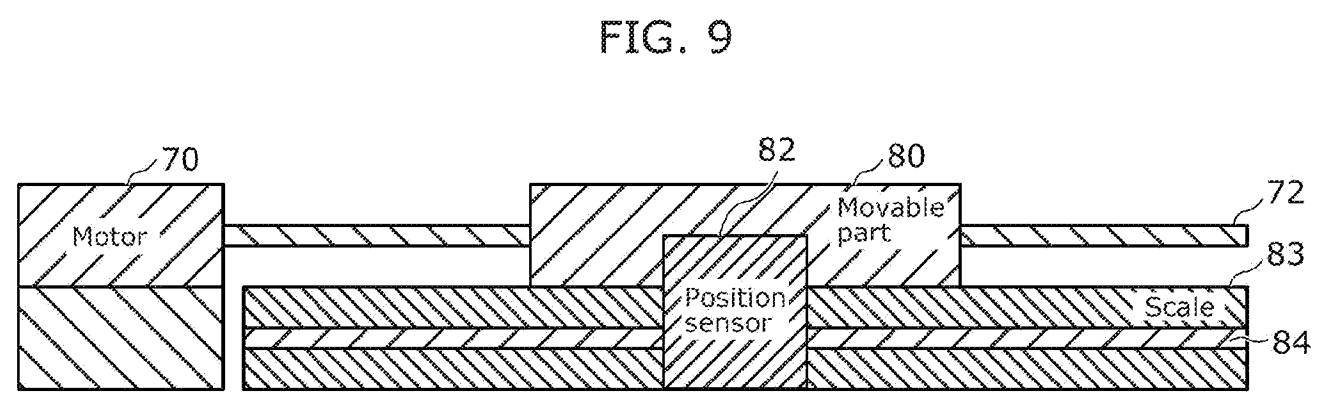

FIG. 9 is a schematic diagram showing that position sensor 82 is attached to movable part 80 connected to motor 70 via screw 72.

As shown in FIG. 9, for example, position sensor 82 may detect the position of movable part 80 by reading a value from indicator 84 of scale 83, which includes indicator 84 indicating the position of movable part 80. In this case, position sensor 82 may include an imaging device, which captures an image of indicator 84 of scale 83, for example, and detect the position of movable part 80 through image processing on the image captured by the imaging device.

Referring back again to FIG. 8, description of motor control system 1A will be continued.

Sensor information obtainer 20A obtains position information output from position detector 71, acceleration information output from acceleration sensor 81, and movable part position information output from position sensor 82.

Calculation value determiner 60A determines whether at least any of the balance indicated by the balance information or the detection sensitivity indicated by the detection sensitivity information as calculated by sensor characteristic calculator 30 deviates from a predetermined reference value. Assume that the position of movable part 80 as indicated by the movable part position information obtained by sensor information obtainer 20A meets a predetermined condition, upon determination on a deviation. In this case, calculation value determiner 60A outputs determination information indicating that at least any of the balance indicated by the balance information or the detection sensitivity indicated by the detection sensitivity information deviates from the predetermined reference value.

[Study]

Assume that at least any of the balance indicated by the balance information or the detection sensitivity indicated by the detection sensitivity information deviates from a predetermined reference value. In addition, assume that the position of movable part 80 as indicated by the movable part position information meets a predetermined condition. In this case, as described above, characteristic calculation device 10A with the configuration described above outputs determination information indicating that at least any of the balance indicated by the balance information or the detection sensitivity indicated by the detection sensitivity information deviates from the predetermined reference value.

Accordingly, characteristic calculation device 10A with the configuration described above can notify a user of characteristic calculation device 10A of a possible anomaly in the operation or mounting orientation of acceleration sensor 81 more accurately.

An example has been described where sensor characteristic calculator 30 calculates at least one of the balance information or the detection sensitivity information, based on the position information and acceleration information obtained by sensor information obtainer 20. In Variation 1, sensor characteristic calculator 30 may calculate at least one of the balance information or the detection sensitivity information, based on the movable part position information and acceleration information obtained by sensor information obtainer 20 in place of the position information and acceleration information obtained by sensor information obtainer 20. Alternatively, sensor characteristic calculator 30 may calculate at least one of the balance information or the detection sensitivity information, based on the position information, movable part position information, and acceleration information obtained by sensor information obtainer 20. In Variation 1, the components of characteristic calculation device 10A may perform various processing using the position of movable part 80 as indicated by the movable part position information in place of the position of motor 70 as indicated by the position information.

[Variation 2]

Described below is a motor control system according to Variation 2 obtained by partially modifying motor control system 1 according to the embodiment.

An example has been described where motor control system 1 according to the embodiment has the following configuration. Assume that at least any of the balance indicated by the balance information or the detection sensitivity indicated by the detection sensitivity information as calculated by sensor characteristic calculator 30 deviates from a predetermined reference value. In this case, characteristic calculation device 10 outputs determination information indicating that at least any of the balance indicated by the balance information or the detection sensitivity indicated by the detection sensitivity information deviates from the predetermined reference value. By contrast, an example will be described where a motor control system according to Variation 2 has the following configuration. Assume that the amount of change per unit time in at least any of the balance indicated by the balance information or the detection sensitivity indicated by the detection sensitivity information as calculated by sensor characteristic calculator 30 deviates from a predetermined reference value. In this case, a characteristic calculation device according to Variation 2 outputs determination information indicating that the amount of change per unit time in at least any of the balance indicated by the balance information or the detection sensitivity indicated by the detection sensitivity information deviates from the predetermined reference value.

The components of the motor control system according to Variation 2, which are the same as those of motor control system 1 according to the embodiment, are regarded as being described already. In the following description, the same reference signs are used to represent substantially the same components and detailed description thereof will be omitted. Differences from motor control system 1 will be described mainly.

Figure 10:
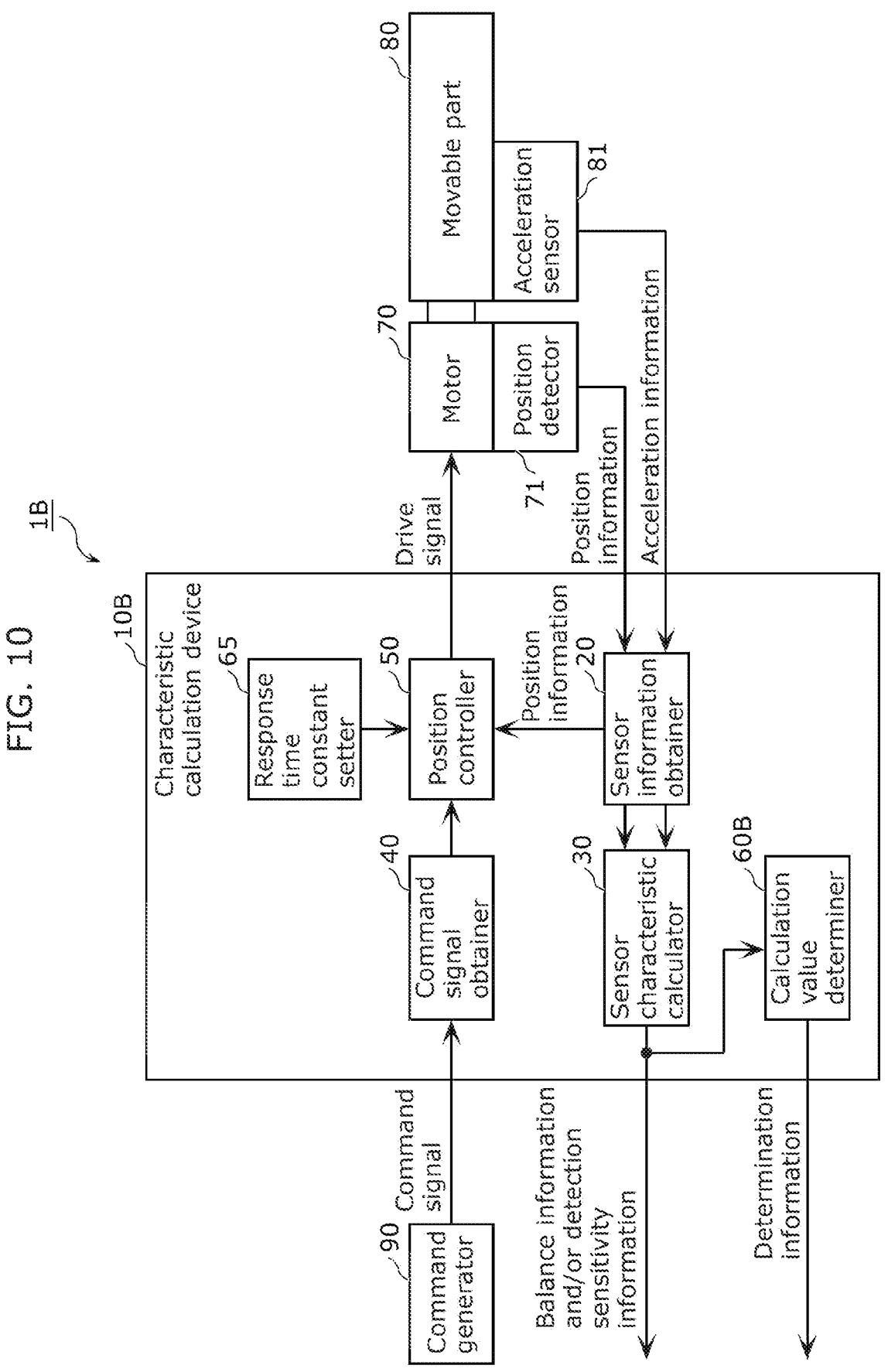
FIG. 10 is a block diagram showing a configuration of a motor control system according to Variation 2.

FIG. 10 is a block diagram showing a configuration of motor control system 1B according to Variation 2.

As shown in FIG. 10, different from motor control system 1 according to Embodiment 1, motor control system 1B includes characteristic calculation device 10B in place of characteristic calculation device 10. Different from characteristic calculation device 10, characteristic calculation device 10B includes calculation value determiner 60B in place of calculation value determiner 60.

Calculation value determiner 60B determines whether the amount of change per unit time in at least any of the balance indicated by the balance information or the detection sensitivity indicated by the detection sensitivity information as calculated by sensor characteristic calculator 30 deviates from a predetermined reference value. Upon determining a deviation, calculation value determiner 60B outputs determination information indicating that the amount of change per unit time in at least any of the balance indicated by the balance information or the detection sensitivity indicated by the detection sensitivity information deviates from the predetermined reference value.

[Study]

Assume that the amount of change per unit time in at least any of the balance indicated by the balance information or the detection sensitivity indicated by the detection sensitivity information deviates from a predetermined reference value. In this case, as described above, characteristic calculation device 10B with the configuration described above outputs determination information indicating that the amount of change per unit time in at least any of the balance indicated by the balance information or the detection sensitivity indicated by the detection sensitivity information deviates from the predetermined reference value.

Accordingly, characteristic calculation device 10B with the configuration described above can notify a user of characteristic calculation device 10B of a possible anomaly in the operation or mounting orientation of acceleration sensor 81.

[Remarks]

While examples of the technique disclosed in this application have been described above based on the embodiment and Variations 1 and 2, the present disclosure is not limited to the embodiment and Variations 1 and 2. One or more aspect of the present disclosure may include forms obtained by various modifications to the foregoing embodiment and variations that can be conceived by those skilled in the art or forms achieved by freely combining the constituent elements and functions in the foregoing embodiment and variations without departing from the scope and spirit of the present disclosure.

An aspect of the present disclosure may be directed not only to such characteristic calculation device 10, for example, but also to a characteristic calculation method including, as steps, characteristic components of characteristic calculation device 10, for example. An aspect of the present disclosure may also be directed to a computer program for causing a computer to execute characteristic steps included in the characteristic calculation method. An aspect of the present disclosure may also be directed to a non-transitory computer-readable recording medium having recorded thereon such a computer program.

INDUSTRIAL APPLICABILITY

The present disclosure is widely applicable to, for example, a system that calculates the characteristics of an acceleration sensor that is attached to a movable part connected to a motor.

The invention claimed is:

1. A characteristic calculation device comprising:
   a sensor information obtainer that obtains position information indicating a position of a motor as detected by a position detector, and acceleration information indicating an acceleration of a movable part connected to the motor as detected by an acceleration sensor attached to the movable part; and
   a sensor characteristic calculator that calculates and outputs at least one of balance information or detection sensitivity information, based on the position information and the acceleration information, the balance information indicating a degree of matching between a direction of an axis of detection by the acceleration sensor and a direction of acceleration to be detected by the acceleration sensor, the detection sensitivity information indicating a detection sensitivity of the acceleration sensor,
   wherein the sensor characteristic calculator calculates the at least one of the balance information or the detection sensitivity information, when an acceleration of the motor as calculated based on the position information does not change for a predetermined period or more.

2. The characteristic calculation device according to claim 1, further comprising:
   a command signal obtainer that obtains a command signal for moving the movable part to a target position, the command signal being generated by a command generator; and
   a position controller that generates a drive signal for driving the motor to move the movable part to the target position, based on the command signal and the position information, and outputs the drive signal generated to the motor, wherein
   the command generator generates the command signal not to change the acceleration of the motor as indicated by the command signal for the predetermined period or more.

3. The characteristic calculation device according to claim 2, wherein the command generator further generates the command signal not to change a position of the motor as indicated by the command signal for the predetermined period or more.

4. The characteristic calculation device according to claim 1, further comprising:

a command signal obtainer that obtains a command signal for moving the movable part to a target position, the command signal being generated by a command generator; and a position controller that generates a drive signal for driving the motor to move the movable part to the target position, based on the command signal and the position information, and outputs the drive signal generated to the motor, wherein the command generator generates the command signal not to change the acceleration of the motor as indicated by the command signal from a first value for a first period longer than a response time constant of the position controller.

5. The characteristic calculation device according to claim 4, wherein the command generator generates the command signal not to change the acceleration of the motor as indicated by the command signal from the first value for the first period longer than the response time constant of the position controller, while the sensor characteristic calculator calculates the at least one of the balance information or the detection sensitivity information.

6. The characteristic calculation device according to claim 4, further comprising:

a response time constant setter that sets the response time constant, wherein the response time constant setter sets the response time constant to cause the first period to be longer than a duration of ringing which occurs in the acceleration of the movable part converging to a second value corresponding to the first value.

7. The characteristic calculation device according to claim 6, wherein the response time constant setter sets the response time constant to cause the first period to be longer than the duration of the ringing, while the sensor characteristic calculator calculates the at least one of the balance information or the detection sensitivity information.

8. The characteristic calculation device according to claim 1, wherein the sensor information obtainer further obtains movable part position information indicating a position of the movable part as detected by a position sensor attached to the movable part, and the sensor characteristic calculator calculates the at least one of the balance information or the detection sensitivity information, based on the movable part position information and the acceleration information in place of the position information and the acceleration information.

9. The characteristic calculation device according to claim 1, further comprising:

a calculation value determiner that outputs determination information indicating that at least any of the degree of matching or the detection sensitivity deviates from a predetermined reference value, when the at least any of the degree of matching or the detection sensitivity deviates from the predetermined reference value.

10. The characteristic calculation device according to claim 9, wherein the sensor information obtainer further obtains movable part position information indicating a position of the movable part as detected by a position sensor attached to the movable part, and the calculation value determiner outputs the determination information, when at least any of the degree of matching or the detection sensitivity deviates from the predetermined reference value, and the position of the movable part indicated by the movable part position information meets a predetermined condition.

11. The characteristic calculation device according to claim 1, further comprising:

a calculation value determiner that outputs determination information indicating that an amount of change per unit time in at least any of the degree of matching or the detection sensitivity deviates from a predetermined reference value, when the amount of change per unit time in the at least any of the degree of matching or the detection sensitivity deviates from the predetermined reference value.

12. The characteristic calculation device according to claim 1, wherein the acceleration sensor is a three-axis acceleration sensor.

13. A characteristic calculation method comprising:

obtaining position information indicating a position of a motor as detected by a position detector, and acceleration information indicating an acceleration of a movable part connected to the motor as detected by an acceleration sensor attached to the movable part; and calculating and outputting at least one of balance information or detection sensitivity information, based on the position information and the acceleration information, the balance information indicating a degree of matching between a direction of an axis of detection by the acceleration sensor and a direction of acceleration to be detected by the acceleration sensor, the detection sensitivity information indicating a detection sensitivity of the acceleration sensor, wherein the sensor characteristic calculator calculates the at least one of the balance information or the detection sensitivity information, when an acceleration of the motor as calculated based on the position information does not change for a predetermined period or more.

14. A non-transitory computer-readable recording medium having recorded thereon a program for causing a characteristic calculation device to execute characteristic calculation processing, wherein the characteristic calculation processing includes:

obtaining position information indicating a position of a motor as detected by a position detector, and acceleration information indicating an acceleration of a movable part connected to the motor as detected by an acceleration sensor attached to the movable part; and calculating and outputting at least one of balance information or detection sensitivity information, based on the position information and the acceleration information, the balance information indicating a degree of matching between a direction of an axis of detection by the acceleration sensor and a direction of acceleration to be detected by the acceleration sensor, the detection sensitivity information indicating a detection sensitivity of the acceleration sensor, wherein the sensor characteristic calculator calculates the at least one of the balance information or the detection sensitivity information, when an acceleration of the motor as calculated based on the position information does not change for a predetermined period or more.

\* \* \* \* \*